US011809226B2

(12) United States Patent
Park

(10) Patent No.: US 11,809,226 B2
(45) Date of Patent: Nov. 7, 2023

(54) DISPLAY DEVICE

(71) Applicant: LG ELECTRONICS INC., Seoul (KR)

(72) Inventor: Sungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 17/602,225

(22) PCT Filed: Jul. 29, 2019

(86) PCT No.: PCT/KR2019/009393
§ 371 (c)(1),
(2) Date: Oct. 7, 2021

(87) PCT Pub. No.: WO2020/209446
PCT Pub. Date: Oct. 15, 2020

(65) Prior Publication Data
US 2022/0171428 A1    Jun. 2, 2022

(30) Foreign Application Priority Data

Apr. 8, 2019  (KR) .......................... 10-2019-0041074

(51) Int. Cl.
G06F 1/16        (2006.01)
(52) U.S. Cl.
CPC ................................. G06F 1/1607 (2013.01)
(58) Field of Classification Search
CPC ..................................................... G06F 1/1607
USPC ........................................................... 248/917
See application file for complete search history.

(56) References Cited

U.S. PATENT DOCUMENTS

| 6,229,584 B1 * | 5/2001 | Chuo ..................... G06F 1/1601 345/905 |
| 6,603,656 B2 * | 8/2003 | Cho .......................... G06F 1/18 16/346 |
| 6,758,454 B2 * | 7/2004 | Smed .................. F16M 11/2092 248/314 |
| 6,967,668 B2 * | 11/2005 | Byoun .................... F16M 13/02 345/55 |
| 7,591,443 B2 * | 9/2009 | Lee ......................... F16M 11/22 361/600 |
| 7,651,062 B2 * | 1/2010 | Matsutani ............... F16M 11/10 248/917 |
| 7,672,121 B2 * | 3/2010 | Li .......................... G06F 1/1601 248/371 |
| 7,686,271 B2 * | 3/2010 | Takao ................... F16M 11/105 248/371 |

(Continued)

FOREIGN PATENT DOCUMENTS

CN    206875054 U    1/2018
KR    10-0526619 B1    11/2005
(Continued)

Primary Examiner — Adrian S Wilson
(74) Attorney, Agent, or Firm — Birch, Stewart, Kolasch & Birch, LLP

(57) ABSTRACT

A display device according to an embodiment of the present invention comprises: a display part having a first coupling part provided on the bottom part thereof; and a support member having, at the upper part thereof, a second coupling part slidably coupled to the first coupling part so as to support the bottom part of the display part at the lower part thereof.

18 Claims, 10 Drawing Sheets

(56) References Cited

U.S. PATENT DOCUMENTS

| | | | | |
|---|---|---|---|---|
| 7,733,645 | B2* | 6/2010 | Hsu | F16M 13/02 248/188.8 |
| 7,907,391 | B2* | 3/2011 | Park | F16M 13/02 361/679.21 |
| 8,059,392 | B2* | 11/2011 | Hsu | G06F 1/1601 361/679.21 |
| 8,264,838 | B2* | 9/2012 | Fujikawa | F16M 11/2014 248/220.22 |
| 8,967,559 | B2* | 3/2015 | Ogura | F16M 11/16 248/917 |
| 9,185,818 | B2* | 11/2015 | Lee | H04N 5/64 |
| 10,154,227 | B2* | 12/2018 | Ikemoto | H05K 5/0204 |
| 10,955,873 | B1* | 3/2021 | Godfrey | H05K 5/0234 |
| 2005/0023418 | A1* | 2/2005 | Kim | G06F 1/1601 248/291.1 |
| 2005/0041379 | A1* | 2/2005 | Jang | F16M 11/045 248/917 |
| 2006/0256516 | A1* | 11/2006 | Cho | G06F 1/1616 361/679.55 |
| 2007/0097608 | A1* | 5/2007 | Matsutani | F16M 11/10 248/917 |
| 2009/0079665 | A1* | 3/2009 | Moscovitch | F16M 11/10 345/1.3 |
| 2009/0141439 | A1* | 6/2009 | Moser | G06F 1/1637 361/679.29 |
| 2009/0174988 | A1* | 7/2009 | Roehl | F16M 13/02 361/679.01 |
| 2013/0044099 | A1 | 2/2013 | Yuen | |
| 2013/0257733 | A1* | 10/2013 | Moore | G06F 1/1618 345/168 |
| 2014/0313665 | A1* | 10/2014 | Delpier | G06F 1/1679 361/679.55 |

FOREIGN PATENT DOCUMENTS

| | | |
|---|---|---|
| KR | 10-2006-0097965 A | 9/2006 |
| KR | 10-0630973 B1 | 10/2006 |

\* cited by examiner

DISPLAY DEVICE

CROSS REFERENCE TO RELATED APPLICATIONS

This application is the National Phase of PCT International Application No. PCT/KR2019/009393, filed on Jul. 29, 2019, which claims priority under 35 U.S.C. 119(a) to Patent Application No. 10-2019-0041074, filed in the Republic of Korea on Apr. 8, 2019, all of which are hereby expressly incorporated by reference into the present application.

TECHNICAL FIELD

The present disclosure relates to a display device, and more particularly to a display device with an improved support structure of a display module.

BACKGROUND ART

With the development of the information society, various types of demands for display devices are increasing. Various display devices such as a liquid crystal display (LCD), a plasma display panel (PDP), an electroluminescent display (ELD), a vacuum fluorescent display (VFD), and an organic light emitting diode display have been recently studied and used in response to the various types of demands.

These display devices can be used in various types. For example, a display device may be configured such that a support member is provided to stably support a display unit including a display module with a thin thickness and a wide area at a bottom surface. Such a type, there is required a support member that can be easily assembled with a display unit and has a structure capable of stably supporting the display unit.

DISCLOSURE

Technical Problem

The present disclosure is to provide a display device with a good assembly and a stable support structure.

Technical Solution

A display device according to an embodiment of the present disclosure includes a display unit in which a first coupling part is provided in a bottom part thereof, and a support member in which a second coupling part slidingly coupled to the first coupling part is provided in a top thereof and which supports the bottom part of the display unit on a lower side thereof.

A concave part having a rear opened and having the first coupling part positioned therein may be positioned in the bottom part of the display unit. The second coupling part is composed of a protruding part protruding to a top of the support member, and may slidingly couple the second coupling part to the first coupling part by inserting the second coupling part or the protruding part into the first coupling part or the concave part from the rear to the front.

The display unit may include a display module and a cover coupled to a rear of the display module. The first coupling part may be provided in a bottom part of the cover.

The top of the support member may be generally positioned under the bottom part of the display unit, and may support the display unit.

The display device may further include a stopper member positioned in a portion adjacent to a front of the display unit in the first coupling part and the second coupling part.

The stopper member may include a protruding portion upward protruding from the second coupling part, an accommodation portion formed in the first coupling part and formed to accommodate the protruding portion at a location corresponding to the protruding portion, and a trapping jaw extended from a rear of the accommodation portion to a lower side thereof.

The display device may further include a fastening member fastened to the first coupling part and the second coupling part and configured to fasten and fix the first coupling part and the second fastening part.

The fastening member may be extended from a bottom of the second coupling part to an upper side thereto through the second coupling part and the first coupling part and fastened to the second coupling part and the first coupling part to fasten and fix a top of the support member and the bottom part of the display unit.

The first coupling part may include a sink portion including a first bottom surface positioned over a main bottom surface in the bottom part of the display unit, and a coupling portion including a second bottom surface positioned within the sink portion and spaced apart from the first bottom surface and first and second rail parts extended from both sides of the second bottom surface to lower sides thereof and then extended to an outside.

The second coupling part may include a first seated part and a second seated part inserted between the first bottom surface and the first rail part, and the second rail part, respectively, and seated on the first rail part and the second rail part, respectively.

The second coupling part may further include a third seated part configured to connect the first seated part and the second seated part in a rear thereof and inserted between the first bottom surface and the second bottom surface.

The first or second rail part may be slantly formed so that a distance between the first bottom surface and the first or second rail part is gradually reduced toward a front. The first or second seated part may include a portion inclined so that a thickness of the first or second seated part is gradually reduced toward the front.

A first fastening hole may be provided in each of the first and second bottom surfaces in the first coupling part. The second coupling part may include a fastening portion having a shape upward protruding toward the second bottom surface and including a second fastening hole. The display device may further include a fastening member inserted under the fastening portion and fastened to the first coupling part and the second coupling part through the first fastening hole and the second fastening hole.

A convex part protruding in accordance with the fastening member may be provided in the fastening portion. The second fastening hole may be formed in an upper front end of the convex part.

The display unit may include a display module and a cover coupled to a rear of the display module.

The display unit may further include a fixing member configured to protrude from an inside of the cover toward a front and spaced apart from a main bottom surface of the cover. The display unit may further include a circuit unit at least part of which is fixed between the main bottom surface and the fixing member.

The fixing member may include a first fixing member and a second fixing member protruding from the inside of the cover toward the front. The circuit unit may include a circuit assembly having both sides fixed to the first fixing member and the second fixing member, and a cable connected to the circuit assembly and positioned between the inside of the cover and the circuit assembly between the first or second fixing member and the main bottom surface.

The support member may include an outer surface part constituting an outer surface, and an inner surface part fixed within the outer surface part.

The display device may further include a fastening member fastened to the first coupling part and the second coupling part and configured to fasten and fix the first coupling part and the second fastening part. A sliding coupling portion involved in the sliding coupling in the second coupling part may be formed in the outer surface part. A fastening portion involved in the fastening and fixing by the fastening member in the second coupling part may be formed in the inner surface part.

The display device may further include a stopper member positioned in a portion adjacent to the front of the display unit in the first coupling part and the second coupling part. A portion of the stopper member formed in the second coupling part may be formed in the outer surface part.

The support member may include a support pole having the second fastening part positioned thereon and up and down extending in a central part thereof, and a prop coupled to a bottom of the support pole to constitute a bottom surface.

The support member may have an integrated structure, so the display device is assembled by the coupling of the support member and the display unit.

Advantageous Effects

According to the present embodiment, structural stability can be improved because the support member positioned under the display unit directly supports weight of the display unit. Accordingly, a problem which may occur due to shaking, etc. (e.g., a phenomenon in which a fine movement occurs or the display device falls, such as that the display device is shaken back and forth due to shaking, etc.) can be prevented.

In this case, assembly convenience can be improved by sliding and coupling the support member to the display unit through fixing or temporary fixing. Furthermore, the fixing or temporary fixing by the sliding and coupling can be more stably performed by the stopper member. The display unit and the support member can be firmly fixed as a simple structure by the fastening and fixing of the fastening member. For example, the support member can be provided as one piece having an integrated structure or a single body, so that assembly convenience, a reduction of the material cost, a neat design, etc. can be implemented.

MODE FOR INVENTION

Figure 1:
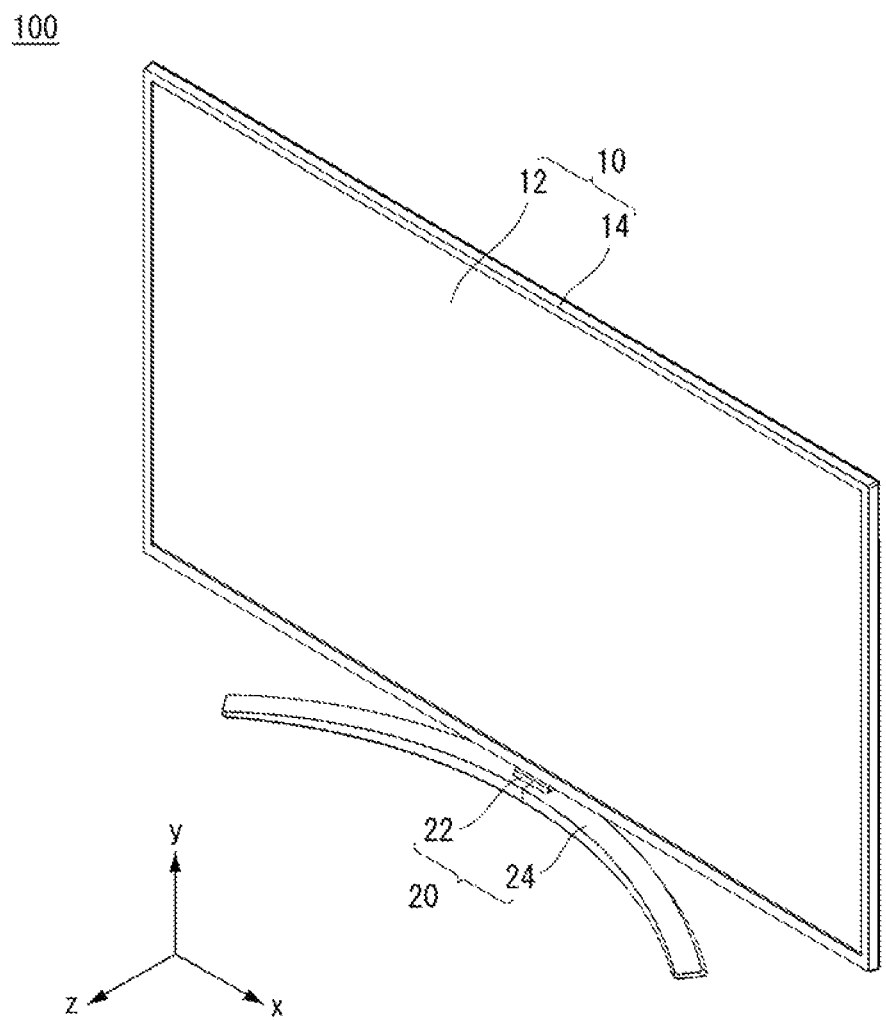
FIG. 1 is a front perspective view illustrating a display device according to an embodiment of the present disclosure.

Reference will now be made in detail to embodiments of the present disclosure, examples of which are illustrated in the accompanying drawings. However, the present disclosure can be embodied in many different forms and should not be construed as limited to embodiments set forth herein.

In the drawings, illustration of parts unrelated to embodiments of the present disclosure is omitted for clarity and simplicity of description. The same reference numerals designate the same or very similar elements throughout the present disclosure. In the drawings, thickness, width, etc. of elements are exaggerated or reduced for clarity of description, and should not be construed as limited to those illustrated in the drawings.

It will be understood that the terms "comprise" and/or "comprising," or "include" and/or "including" used in the specification specify the presence of stated elements, but do not preclude the presence or addition of one or more other elements. In addition, it will be understood that, when an element such as a layer, film, region, or plate is referred to as being "on" another element, it may be directly disposed on another element or may be disposed such that an intervening element is also between them. Accordingly, when an element such as a layer, film, region, or plate is disposed "directly on" another element, this means that there is no intervening element between the elements.

Hereinafter, a display device according to embodiments of the present disclosure will be described in detail with reference to the accompanying drawings.

Figure 2:
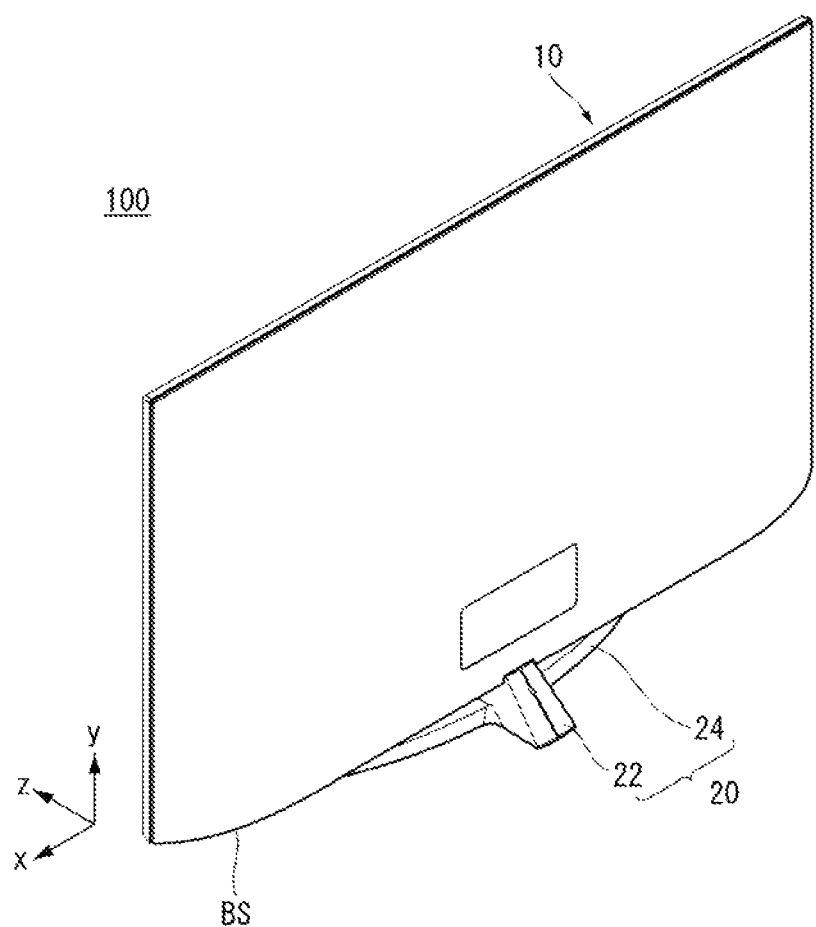
FIG. 2 is a rear perspective view of a display device illustrated in FIG. 1.
Figure 3:
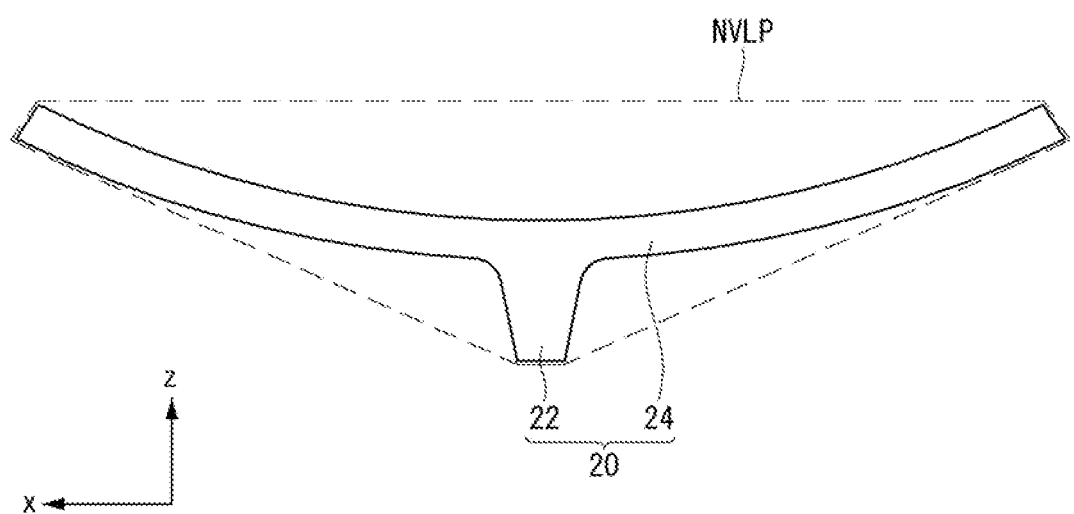
FIG. 3 is a plan view schematically illustrating a lower surface of a support member of a display device illustrated in FIG. 1.

FIG. 1 is a front perspective view illustrating a display device according to an embodiment of the present disclosure. FIG. 2 is a rear perspective view of a display device illustrated in FIG. 1. FIG. 3 is a plan view schematically illustrating a lower surface of a support member of a display device illustrated in FIG. 1.

Referring to FIGS. 1 and 2, a display device 100 according to the present embodiment includes a display unit 10 in which a first coupling part (reference numeral 110 in FIG. 4, hereinafter the same) is provided in a bottom part BS thereof, and a support member 20 on which a second coupling part (reference numeral 210 in FIG. 4, hereinafter the same) slidingly coupled to the first coupling part 110 is provided and which supports the bottom part BS of the display unit 10 on a lower side thereof. This is more specifically described.

The display unit 10 may include a display module 12 and a cover 14 coupled to the display module 12 in the rear of the display module 12.

For reference, the display unit 10 may have an approximate rectangular shape having a given width in a horizontal direction (transverse direction, an x-axis direction in the drawing) and having a given length in an up and down direction (longitudinal direction, a y-axis direction in the drawing). The drawing illustrates an example in which the display unit 10 has a long side in the horizontal direction and has a short side in the up and down direction. However, the width of the display unit 10 in the horizontal direction and the length of the display unit 10 in the up and down direction may be substantially identical or the display unit 10 may have a short side in the horizontal direction and may have a long side in the up and down direction. Furthermore, a thickness direction perpendicular to a screen of the display unit 10 may be called a front and rear direction (z-axis direction in the drawing). In this case, a direction from the cover 14 of the display unit 10 to the display module 12, that is, a direction toward a surface on which a screen is displayed, may be called a front (positive z-axis direction in the drawing). A direction from the display module 12 of the display unit 10 to the cover 14, that is, a direction toward a surface on which a screen is not displayed, may be called a rear (negative z-axis direction in the drawing).

The display module 12 is provided in the front surface of the display device 100, and may be various devices in which an image is displayed using various structures or methods. For example, the display module 12 may be a liquid crystal display device, a plasma display panel, an electroluminescence display, a vacuum fluorescent display, an organic light emitting diode, etc. The display module 12 may have a flexible characteristic or may not have a flexible characteristic. The display module 12 may further include a frame, a bezel, a module cover, etc. which are fixed to a rear surface and/or a side.

A circuit unit (reference numeral 16 in FIG. 6, hereinafter the same) for driving the display module 12 may be provided in the rear of the display module 12. The circuit unit 16 may include various members, articles, etc. For example, the circuit unit 16 may include a power supply member, a driving member, a tuner member, a circuit assembly (reference numeral 16a in FIG. 6, hereinafter the same), a cable (reference numeral 16b in FIG. 6, hereinafter the same), etc. The power supply member may supply power to the display module 12. The driving member may adjust an image displayed in the display module 12. The tuber member may receive broadcasting information or external input information and provide the broadcasting information or external input information to the driving member. The circuit assembly 16a may include a circuit member having various roles, etc., and may be an infrared receiving part for recognizing a signal from a remote controller, for example. The cable 16b is connected to the circuit assembly 16a, and may play a role to transfer a signal. The cable 16b connected to the circuit assembly 16a may be connected to another member of the circuit unit 16. The circuit assembly 16a and the cable 16b may play various roles, and may have various structures.

In the present embodiment, the circuit unit 16 may be positioned between the rear of the display module 12 and the front of the cover 14. In this case, the circuit unit 16 may be positioned at various locations or may be fixed to various locations. For example, the circuit unit 16 may be fixed to the rear of the display module 12 or the front of the cover 14 or on the bottom part BS of the cover 14.

The cover 14 can stably protect the display module 12 and the circuit unit 16 and improve an external appearance of the display unit 10 by preventing the rear of the display module 12 and the circuit unit 16 positioned therein from being exposed to the outside.

The cover 14 may have various structures, materials, sizes, thicknesses, etc. which can cover and protect the display module 12 and/or the circuit unit 16. For example, the cover 14 may form an integrated structure in the rear of the display module 12. For another example, the cover 14 may separately include a cover that covers a portion other than the circuit unit 16 and a cover that covers the circuit unit 16. In addition, the cover 14 may have various structures. The cover 14 may include metal, a polymer material (e.g., resin), reinforced fiber, etc. The cover 14 may be fitted and fixed to the display module 12 or may be attached and fixed to the display module 12.

The first coupling part 110 for coupling with the support member 20 is provided in the bottom part BS of the display unit 10 (more precisely, the bottom part BS of the cover 14). This is more specifically described later.

The support member 20 may support the bottom part BS of the display unit 10 on the lower side thereof. More specifically, the second coupling part 210 slidingly coupled to the cover 14 of the display unit 10 may be provided at the top of the support member 20. In the present embodiment, the top of the support member 20 is generally positioned under the bottom part BS of the display unit 10, and the support member 20 may stably support the bottom part BS of the display unit 10. Accordingly, a problem in which the display unit 10 falls to the front, etc. can be effectively prevented. For example, in the present embodiment, a portion positioned in the rear of the display unit 10 is not present in the support member 20. Accordingly, the structure of the support member 20 can be simplified. However, the present disclosure is not limited thereto, and at least part of the support member 20 may be positioned in the rear of the display unit 10.

Furthermore, in the present embodiment, the second coupling part 210 of the support member 20 may be fastened and fixed to the first coupling part 110 of the display unit 10 (more specifically, the cover 14) by a fastening member (reference numeral 310 in FIG. 4, hereinafter the same). Detailed structures of the second coupling part 210 and the fastening member 310 are more specifically described later.

As described above, if the sliding coupling of the display unit 10 and the support member 20 and the fastening and fixing using the fastening member 310 are used, the assembly of the display unit 10 and the support member 20 can be improved, and the display unit 10 and the support member 20 can also be firmly assembled.

The support member 20 may include a support pole 22 having the second fastening part 210 positioned thereon and extending from the central part of the display unit 10 to the up and down direction (y-axis direction in the drawing) when viewed in the horizontal direction (x-axis direction in the drawing), and a prop 24 coupled to the bottom of the support pole 22 and constituting a bottom surface thereof. In the present embodiment, the support member 20 including the support pole 22 and the prop 24 has an integrated structure, so the display device 100 can be assembled by the coupling of the support member 20 and the display unit 10. That is, the support member 20 coupled to the display unit 10 is provided as a single body, and the assembly of the display device 100 can be completed by coupling the support member 20 to the display unit 10. In this case, the integrated structure or the single body may include that a plurality of portions functions as a single structure, such as that the plurality of portions is separately fabricated and coupled and then moved and stored as a single structure upon movement and storage, in addition to a constructing having a single structure.

For example, in the present embodiment, the support member 20 may include an outer surface part (reference numeral 202 in FIG. 4, hereinafter the same) constituting an outer surface, and an inner surface part 204 fixed within the outer surface part (reference numeral 204 in FIG. 4, hereinafter the same) and including a fastening portion (reference numeral 212 in FIG. 4, hereinafter the same) of the second coupling part 210. Furthermore, the outer surface part 202 may consist of a plurality of portions which may have a desired outside shape of the support pole 22 and a desired outside shape of the prop 24. Accordingly, the desired outside shape of the support member 20 can be implemented through a simple structure and a manufacturing process by the outer surface part 202. The fastening portion 212 of the second coupling part 210 may be fabricated to have a structure, excellent strength, etc. suitable for the fastening. The outer surface part 202 consisting of the plurality of portions and the inner surface part 204 may be coupled to have an integrated structure, thus being capable of constituting an integrated structure or a single body.

The outer surface part 202 and the inner surface part 204 may include different materials by considering a necessary characteristic, and may be made of the same material. The outer surface part 202 and the inner surface part 204 may be coupled using various methods, such as adhesion and fitting coupling. For example, the outer surface part 202 may include resin and have an excellent external appearance. The inner surface part 204 may include metal and can improve stability upon fastening. In this case, the outer surface part 202 includes a resin plate made of resin and a metal plate closely attached to the inside of the resin plate, and thus may have an excellent external appearance and excellent strength. For example, the metal plate of the outer surface part 202 and the inner surface part 204 may be fastened and fixed by a fastening member, etc. Accordingly, the outer surface part 202 and the inner surface part 204 can be fixed as a simple structure. However, the present disclosure is not limited thereto, and a material, a fixing structure, etc. of the outer surface part 202 and the inner surface part 204 may be variously changed.

A front surface toward the front in the support pole 22 may be positioned on the same plane as the display unit 10 under the display unit 10 or positioned in the rear of the display unit 10 in order to prevent an external appearance of the display device 100 from being spoiled. Furthermore, the support pole 22 has a larger area at the bottom than at the top, and can stably support the display unit 10. In this case, the support pole 22 is directed from the top to the bottom, and thus may have a shape in which the rear surface of the support pole 22 more protrudes toward the rear. Accordingly, an external appearance of the display device 100 can be prevented from being spoiled because a portion protruding toward the front of the display unit 10 is not provided over the support pole 22 fixed to the display unit 10. The bottom of the support pole 22 protrudes toward (e.g., more protrude toward the rear than other portion of the prop 24) and thus have a sufficient area. The bottom of the support pole 22, together with the prop 24, constitutes the bottom surface of the support member 20. If the area of the bottom of the support pole 20 is sufficiently secured, the support member 20 and the display unit 10 fixed thereto can be stably fixed.

Furthermore, both sides connecting the front and rear surfaces of the support pole 22 may be inclined as a symmetrical structure in which the width or area of the support pole 22 is increased from the top to the bottom. Accordingly, an external appearance of the support pole 22 and structural stability of the support member 22 can be improved. However, the present disclosure is not limited thereto. Accordingly, both sides of the support pole 22 may be formed perpendicularly to the bottom surface, and thus the width of the support pole 22 in the horizontal direction may be uniform. Various other modifications are possible.

The prop 24 is coupled to the bottom of the support member 20, and may constitute a bottom surface of the support member 20. The prop 24 can provide balance to the support member 20 by securing a given area in the bottom surface. In the present embodiment, the prop 24 is extended to both sides of the support pole 22 and may have a shape lengthily connected in the left and right direction or the horizontal direction and may also have a shape bent or crooked between both end parts. For example, the prop 24 may have a shape that is convexly bent or crooked toward the rear. For example, the prop 24 may have a bow or linear crescent shape that is convex toward the rear.

In this case, the bottom surface of the support member 20 may form an envelope NVLP as indicated by dotted line in FIG. 3. The envelope NVLP may have a convex shape that surrounds the outside of the bottom surface of the support member 20. When the area of the envelope NVLP is increased, the stability of the support member 20 may be increased. By means of the shape of the support pole 22 and the prop 24, the stability of the support member 20 can be improved because the area of the envelope NVLP can be increased.

Various known structures, such as the structure of the support pole 22, the structure of the prop 24, and the coupling structure of the support pole 22 and the prop 24, may be applied, but the present disclosure is not limited thereto.

Hereinafter, detailed structures of the first coupling part 110 of the display unit 10, the second coupling part 210 of the support member 20, and the fastening member 310 according to the present embodiment are described in detail with reference to FIGS. 4 to 10.

First, the first coupling part 110 of the display unit 10 and the fixing structure of the circuit unit 16 using the first coupling part 110 are described with reference to FIGS. 4 to 7.

Figure 4:
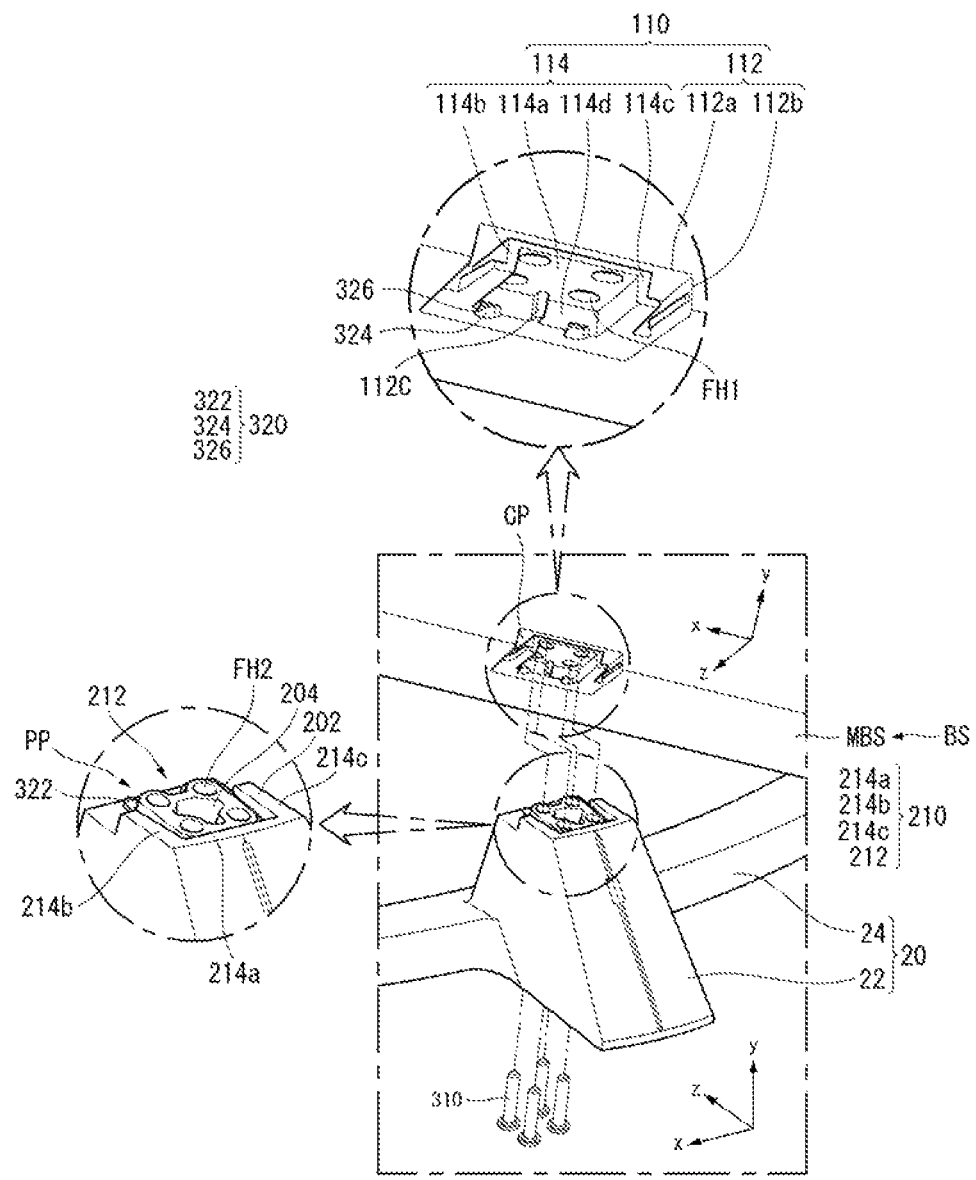
FIG. 4 is a partial exploded perspective view illustrating a part of the display device illustrated in FIG. 1.
Figure 5:
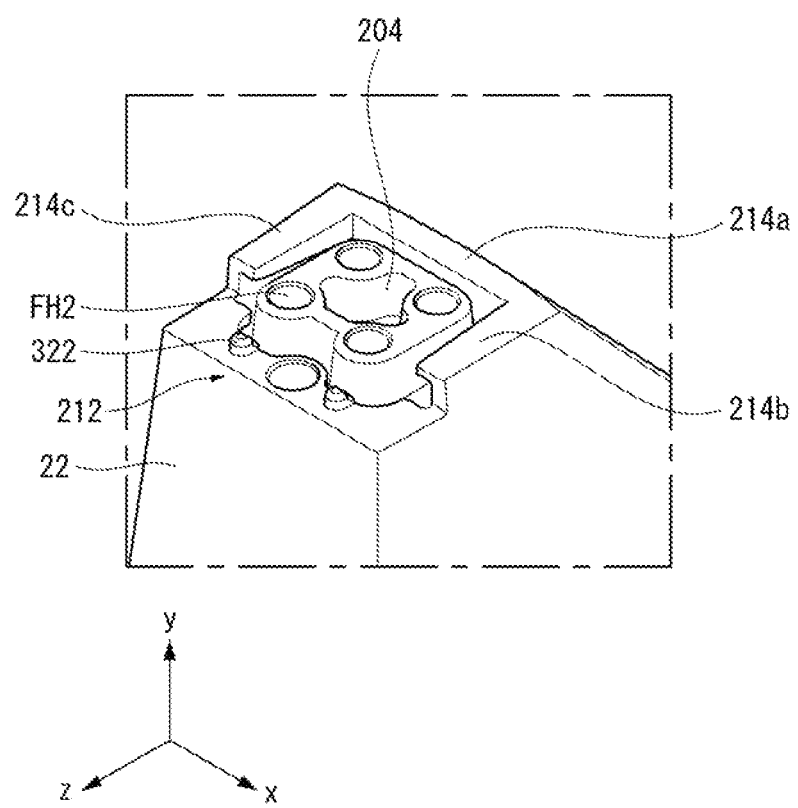
FIG. 5 is a partial front perspective view illustrating a part of a second coupling part illustrated in FIG. 4.
Figure 6:
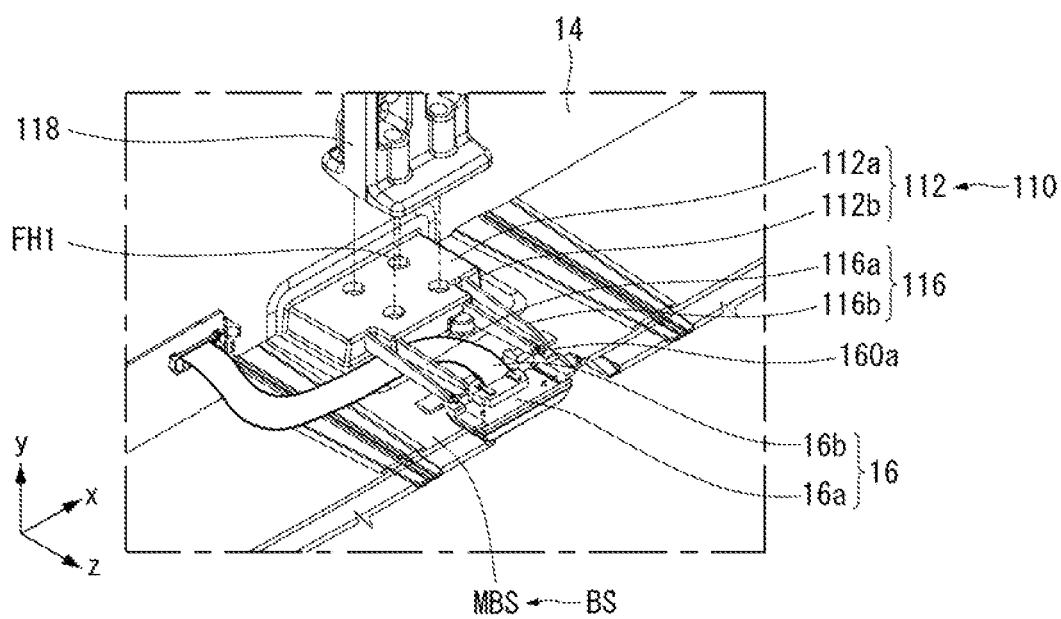
FIG. 6 is a partial exploded perspective view illustrating a part of a cover and a circuit unit included in a display device illustrated in FIG. 1 when viewed from an inner surface of the cover.
Figure 7:
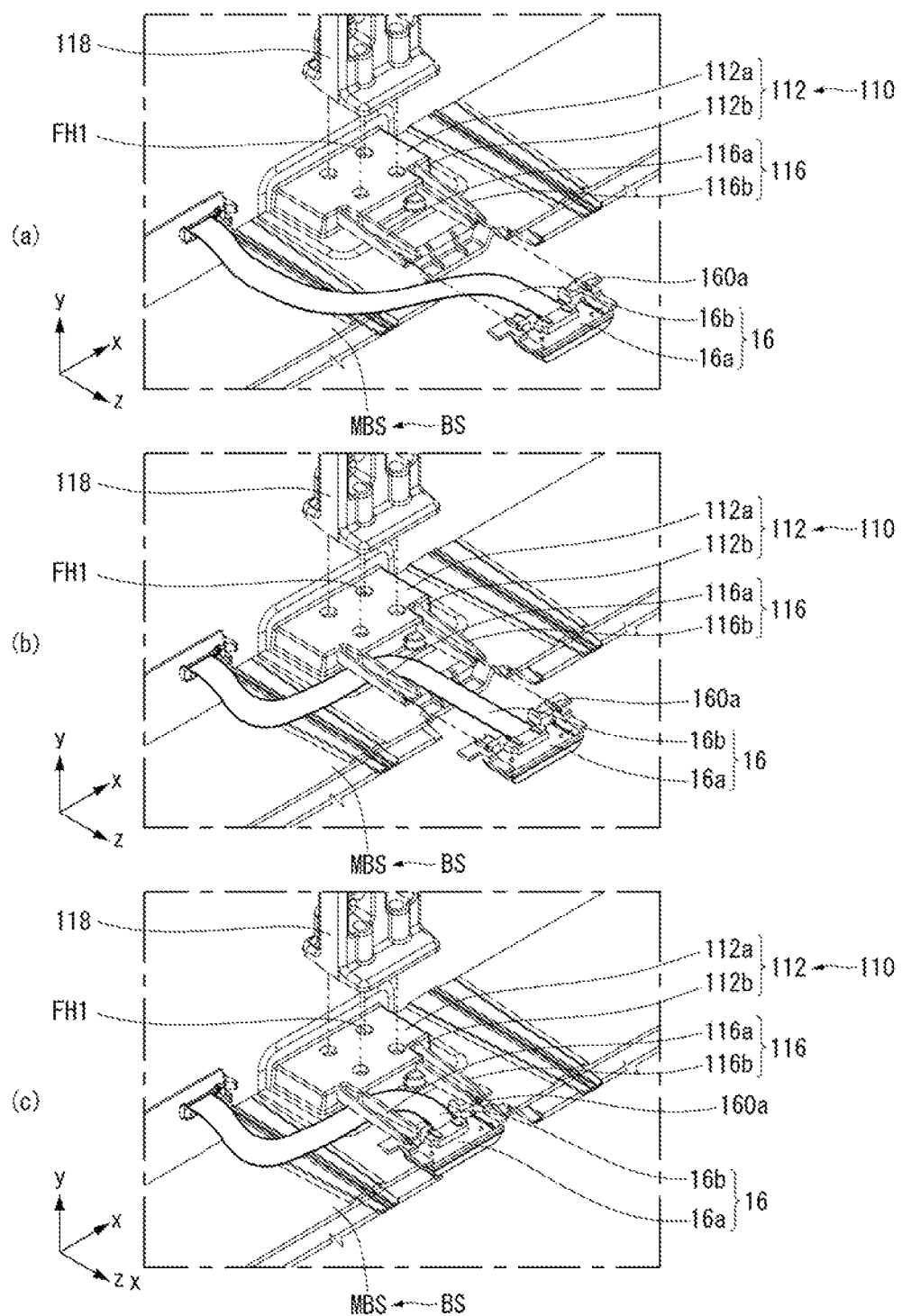
FIG. 7 is a coupling state diagram schematically illustrating a method of fixing a part of the circuit unit illustrated in FIG. 6 to a first coupling part.

FIG. 4 is a partial exploded perspective view illustrating a part of the display device 100 illustrated in FIG. 1. FIG. 5 is a partial front surface perspective view illustrating a part of the second coupling part illustrated in FIG. 4. FIG. 6 is a partial exploded perspective view of a part of the cover 14 and the circuit unit 16 included in the display device 100 illustrated in FIG. 1, which is viewed from the inside of the cover 14. For simple illustration, the fastening member 310 is not illustrated in FIG. 6. FIG. 7 is a coupling state diagram schematically illustrating a method of fixing a part of the circuit unit 16 illustrated in FIG. 6 to the first coupling part 110.

Referring to FIGS. 4 to 7, in the present embodiment, there is provided a concave part CP whose rear is opened in the bottom part BS of the display unit 10 (more specifically, the cover 14) and in which the first coupling part 110 is positioned.

In this case, the first coupling part 110 may include a sink portion 112 including a first bottom surface 112a positioned at a higher location than a main bottom surface MBS in the bottom part BS of the cover 14. The sink portion 112 includes a side 112b extended from an edge of the first bottom surface 112a to the bottom and connecting the first bottom surface 112a and the main bottom surface MBS. In this case, the side 112b is formed in accordance with only a front edge of the first bottom surface 112a and both edges connected thereto, and is not formed in a rear edge of the first bottom surface 112a. Accordingly, the concave part CP that is opened toward the rear is positioned in a central portion of the bottom part BS of the cover 14 by the first bottom surface 112a and the side 112b of the sink portion 112.

Furthermore, the first coupling part 110 may include a coupling portion 114 positioned within the sink portion 112. The coupling portion 114 is spaced apart from the first bottom surface 112a in the up and down direction and may be extended from the side 112b of the sink portion 112 (particularly, a front side connected to the front edge of the first bottom surface 112a). Accordingly, a given interval or space into which at least part of a protruding part PP of the second coupling part 210 may be inserted may be provided between the first bottom surface 112a and the coupling portion 114.

More specifically, the coupling portion 114 is a portion that provides a structure to which the second coupling part 210 is slidingly coupled, and may include a second bottom surface 114a spaced apart from the first bottom surface 112a and positioned under the first bottom surface 112a, and first and second rail parts 114b and 114c extended from both edges of the second bottom surface 114a to the bottom, bent and then extended to the outside. The coupling portion 114 may further include an extension portion 114d extended from the front edge of the second bottom surface 114 to the bottom, bent and then extended to the front.

At least part (i.e., an accommodation portion 324 and a trapping jaw 326) of a stopper member 320 may be formed in the extension portion 114d. This is more specifically described later.

A first fastening hole FH1 in which the fastening member 310 will be inserted and fastened to the first bottom surface 112a and the second bottom surface 114a may be provided in the first coupling part 110. This is subsequently described in detail along with a second fastening hole FH2 formed in the second coupling part 210 and the fastening member 310.

Furthermore, a fixing member 116 for fixing at least part of the circuit unit 16 may be positioned in the inside of the cover 14, more specifically, the front side (more specifically, the front side of the sink portion 112) of the first coupling part 110. The fixing member 116 may protrude from the front side of the sink portion 112 to the front, and may be positioned at a given interval from the main bottom surface MBS. In this case, at least part (e.g., at least part of the circuit assembly 16a and the cable 16b) of the circuit unit 16 may be positioned and fixed at an interval between the main bottom surface MBS and the fixing member 116.

For example, the fixing member 116 may include a first fixing member 116a and a second fixing member 116b positioned on both sides in the front side of the sink portion 112, respectively. In this case, the circuit assembly 16a may be fixed to the first fixing member 116a and the second fixing member 116b, and the cable 16b connected to the circuit assembly 16a may be positioned between the first or second fixing member 116a or 116b and the main bottom surface MBS. More specifically, coupling parts 160a fitted and coupled to the front parts of the first and second fixing members 116a and 116b are provided at both sides of the circuit assembly 16a, respectively. In this case, the cable 116a may be positioned between a side 112b (more precisely, the front side) of the sink portion 112 and the coupling part 160a between the first or second fixing member 116a and the main bottom surface MBS. Various structures fixed by pushing the circuit assembly 16a toward the first and second fixing members 116a and 116b may be used as the first and second fixing members 116a and 116b and the coupling part 160a of the circuit assembly 16a. For example, the first and second fixing members 116a and 116b and the coupling part 160a may be coupled by fitting coupling. In this case, a trapping hook may be formed in one of the first and second fixing members 116a and 116b and the coupling part 160a, and a trapping part (trapping jaw or trapping hole) may be formed in the other thereof. The trapping hook and the trapping part can provide a mutually engaged and fixed structure. Accordingly, the trapping hook formed in one of the first and second fixing members 116a and 116b and the coupling part 160a may be trapped and fixed in the trapping part formed in the other thereof. In the drawings, an example in which an opening part has been formed in the portion of the bottom part BS in a portion into which the circuit assembly 16a is inserted has been illustrated, but the present disclosure is not limited thereto. Accordingly, the circuit assembly 16a, etc. can be positioned without forming a concave part, etc. in the bottom part BS or without forming a concave part, an opening part, etc. in the bottom part BS. Various other structures, shapes, etc. may be applied.

The fixing structure of the circuit unit 16 using the fixing member 116 may be implemented as illustrated in FIGS. 7(a) to 7(c). That is, the cable 16b can be fixed between the side 112a (e.g., the front side) of the sink portion 112 and the coupling part 160a between the fixing member 116 and the main bottom surface MBS by pushing and inserting the cable 16b connected to the circuit assembly 16a, as illustrated in FIG. 7(a), between the main bottom surface MBS and the fixing member 116 as illustrated in FIG. 7(b) and then fitting and coupling the coupling part 160a of the circuit assembly 16a to the fixing member 116 as illustrated in FIG. 7(c).

Accordingly, the circuit unit 16 can be fixed using the fixing member 116, and at least part (particularly, the cable 16b) of the circuit unit 16 can be fixed between the fixing member 116 and the main bottom surface MBS on the outside of the sink portion 112. Accordingly, a problem which may occur because the circuit unit 16 breaks away from a desired location, a problem which may occur because the cable 16b is fit by the inside bracket 118 on the upper side of the first bottom surface 112a of the sink portion 112, etc. can be prevented. In particular, the aforementioned problem can be prevented by a simple structure and process, and a problem attributable to a bad operation can also be prevented.

For example, if the circuit assembly 16a is an infrared receiving part for recognizing a signal from a remote controller, when a phenomenon in which the cable 16b sticks, etc. undesirably occurs as described above, a problem, such as a detection failure of the remote controller, may occur. In order to prevent such a problem, if subsidiary materials such as a tape are used, a manufacturing process becomes complicated and a cost may rise. A problem, such as a bad operation attributable to subsidiary materials such as a tape, may occur.

Figure 9:
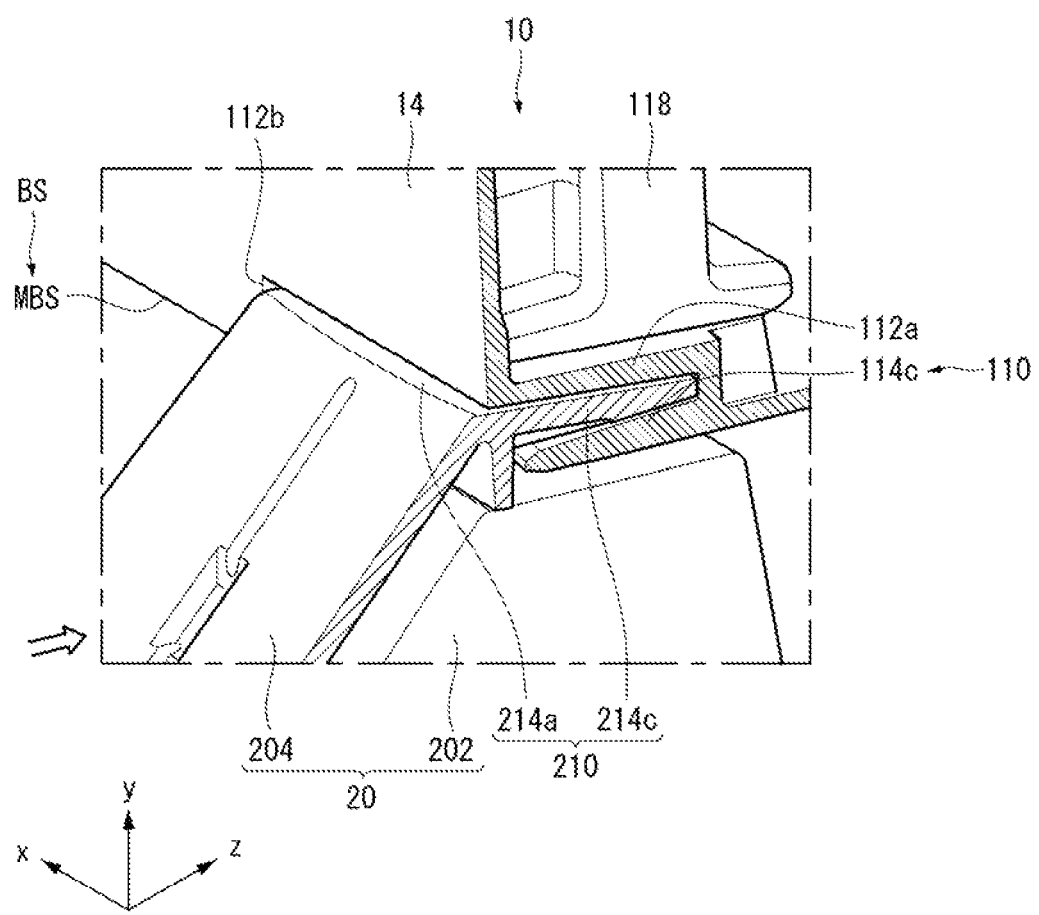
FIG. 9 is a cut perspective view taken along line A-A of FIG. 8.
Figure 10:
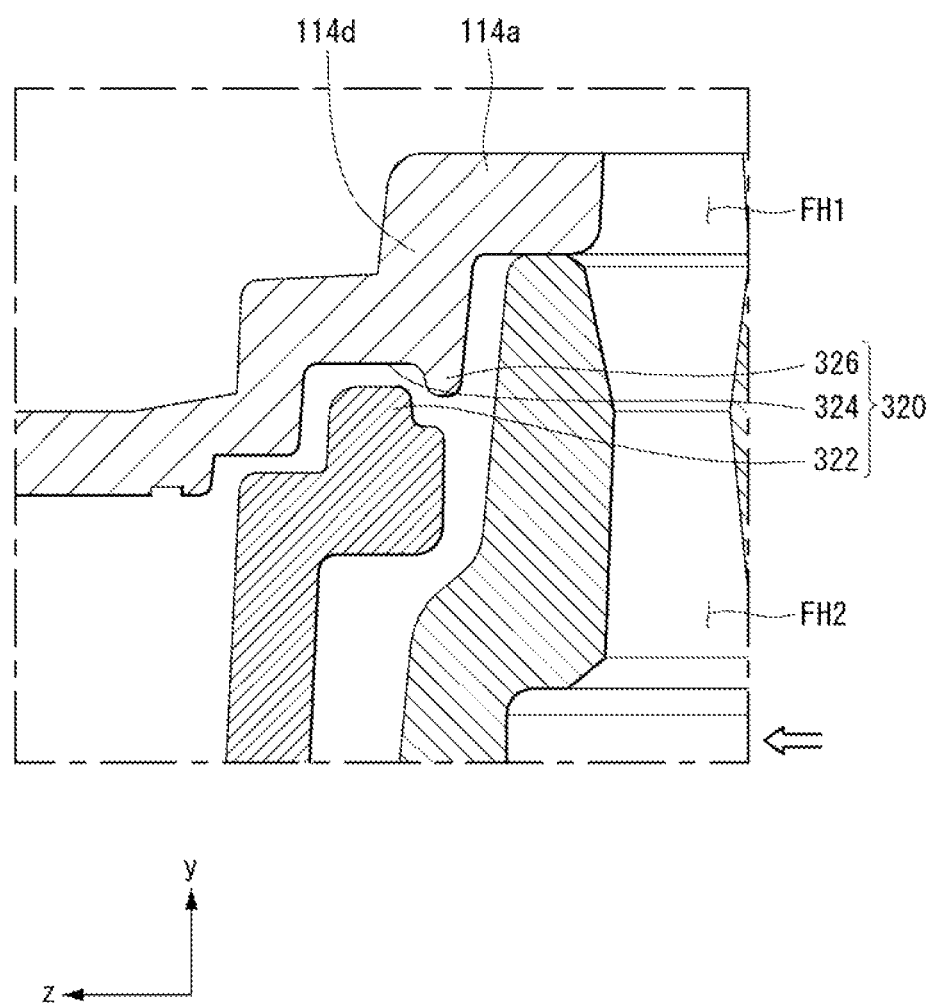
FIG. 10 is a partial cross-sectional view taken along line B-B of FIG. 8.

Hereinafter, the sliding coupling and fastening and fixing of the second coupling part 210 of the support member 20 and the fastening member 310, and the display unit 10 and the support member 20 using the same are described in detail with reference to FIGS. 8 to 10 along with FIGS. 4 to 7.

Figure 8:
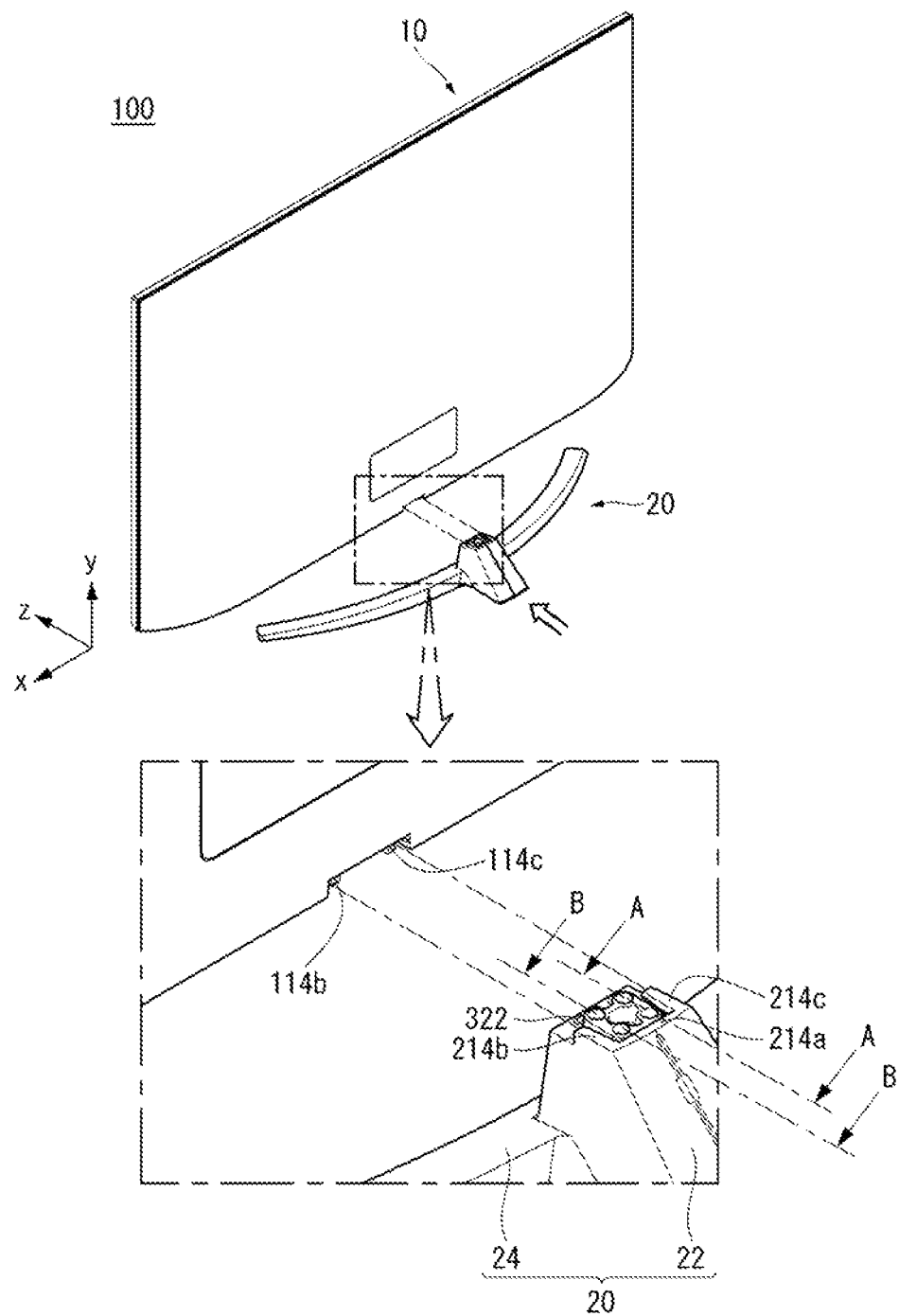
FIG. 8 is an exploded perspective view illustrating the sliding coupling of a display unit and a support member included in the display device illustrated in FIG. 1.

FIG. 8 is an exploded perspective view for describing the sliding coupling of the display unit 10 and the support member 20 included in the display device 100 illustrated in FIG. 1. FIG. 9 is a cutaway perspective view of the display unit 10 and the support member 20, which is taken and viewed along line A-A of FIG. 8. FIG. 10 is a partial cross-sectional view illustrating a part of the cross section taken along line B-B of FIG. 8.

Referring to FIG. 4 to, in the present embodiment, the second coupling part 210 positioned at the top of the support member 20 may constitute the protruding part PP that protrudes upward. Accordingly, the second coupling part 210 may be slidingly coupled to the first coupling part 110 by inserting the second coupling part 210 of the support member 20 or the protruding part PP into the first coupling part 110 or the concave part CP from the rear toward the front. In this case, the protruding part PP is generally coupled to the inside of the concave part CP, so the top of the support member 20 (more specifically, the top of the support pole 22) may be generally positioned under the bottom part BS of the display unit 10, thereby being capable of supporting the display unit 10.

The second coupling part 210 may include a first seated part 214b and a second seated part 214c inserted between the sink portion 112, and the first rail part 114b and the second rail part 114c and seated in the first rail part 114b and the second rail part 114c, respectively, on both sides of the second coupling part 210. Accordingly, fixing stability can be improved by sliding and coupling on both sides of the first and second coupling parts 110 and 210.

In this case, the first seated part 214b may include a first extension portion upward protruded and positioned between the end of the first rail part 114b and the side 112b of the sink portion 112, and a first seated portion elongated from the first extension portion to the inside and seated on the first rail part 114b. Likewise, the second d seated part 214c may include a second extension portion upward protruded and positioned between the end of the second rail part 114c and the side 112b of the sink portion 112, and a second seated portion elongated from the second extension portion to the inside and seated on the second rail part 114c.

In this case, the first and second rail parts 114b and 114c, and the first and second seated parts 214b and 214c may have a shape elongating in the front and rear direction (z-axis direction in the drawing). For example, as illustrated in FIG. 9, the first or second rail part 114b or 114c may be inclined so that a distance between the first bottom surface 112a and the first or second rail part 114b or 114c is gradually reduced toward the front. The first or second seated part 214b or 214c in the up and down direction may include an inclined portion so that a thickness of the first or second seated part 214b or 214c is gradually reduced toward the front in accordance with the first or second rail part 114b or 114c. Accordingly, a distance between the first bottom surface 112a and the first or second rail part 114b or 114c is greater than a thickness of a front portion of the first or second seated part 214b or 214c at the entrance, that is, a portion into which the first or second seated part 214b or 214c is inserted. Accordingly, the front portion of the first or second seated part 214b or 214c can be easily inserted into the top of the first or second rail part 114b or 114c. Furthermore, as indicated by an arrow, the first or second seated part 214b or 214c is moved in the length direction of the first or second rail part 114b or 114c by a pushing force from the rear to the front. Accordingly, the first or second seated part 214b or 214c may be naturally positioned to fill the space between the first or second rail part 114b or 114b and the first bottom surface 112a. Accordingly, sliding coupling through the first coupling part 210 and the second coupling part 220 can be easily performed.

Furthermore, the second coupling part 210 may further include a third seated part 214a connecting the first seated part 214b and the second seated part 214c at the rear thereof and inserted between the first bottom surface 112a and the second bottom surface 114a. The third seated part 214a may include a third extension portion upward protruded to form an outer surface outside the display device 100, and a third seated portion extended from the third extension portion to the inside thereof and inserted and filled between the first bottom surface 112a and the second bottom surface 114a. Accordingly, the third seated part 214a may function as a finishing member that forms the outer surface while filling the concave part CP or the opened rear of the first coupling part 110.

The first seated part 214b, the second seated part 214c, and the third seated part 214a may be composed as a part of the outer surface part 202. Accordingly, an external appearance of the display device 100 can be improved because an internal structure (e.g., the fastening portion 212) of the support member 20 is not exposed to the outside by the outer surface part 202.

In this case, the stopper member 320 may be positioned in a portion adjacent to the front in the first coupling part 110 and the second coupling part 210. The stopper member 320 may include a protruding part 322 upward protruded in the portion adjacent to the front in the second coupling part 210, an accommodation portion 324 formed to accommodate the protruding part 322 in a location corresponding to the protruding part 322 in the first coupling part 110, and a trapping jaw 326 downward extended in the rear of the accommodation portion 324. For example, the accommodation portion 324 may be formed in a portion extended from the extension portion 114d to a portion extending to the front. The trapping jaw 326 may be extended from the portion extending from the extension portion 114d to a lower side in a way to fill a part of the rear of the accommodation portion 324. Furthermore, the protruding part 322 may be positioned in a front portion of the outer surface part 202 having a structure separate from the inner surface part 204 in which the fastening portion 212 has been formed, and may easily pass through the trapping jaw 326 by a force pushed from the rear to the front.

Accordingly, when the second coupling part 210 is slidingly coupled by inserting and pushing the second coupling part 210 into the first coupling part 110 from the rear to the front, the protruding part 322 can be seated in the accommodation portion 324 through the trapping jaw 326 by the force pushed from the rear. Accordingly, the second coupling part 210 can be fixed to be not moved to the rear by the trapping jaw 326. For example, when the protruding part 322 passes through the trapping jaw 326, a given sound (e.g., clicking) is generated, so that a user can easily recognize that the protruding part 322 is seated in the accommodation portion 324. Accordingly, assembly can be improved because the temporary fixing of the display unit 10 and the support member 20 can be easily recognized.

For example, the protruding part 322 and the accommodation portion 324 corresponding to the protruding part 322 may be positioned in a portion adjacent to the front of the second and first coupling parts 210 and 110 one by one. Accordingly, the number of stopper members 320 can be reduced and fixing stability by the stopper member 320 can be improved because the stopper member 320 is positioned on both sides in the portion adjacent to the front. However, the present disclosure is not limited thereto, and the number, position, etc. of the stopper member 320 may be variously changed.

Furthermore, the second coupling part 210 may include the fastening portion 212 having a shape upward protruding toward the second bottom surface 114a and including the second fastening hole FH2. The fastening portion 212 may be positioned in a portion surrounded by the first seated part 214b, the second seated part 214c, and the third seated part 214a. Upon coupling, the fastening portion 212 is positioned in a portion surrounded by the second bottom surface 114a and the first and second rail parts 114b and 114c.

In this case, the fastening portion 212 may have a convex part convexly protruded upward in accordance with the second fastening hole FH2 or the fastening member 3101. The second fastening hole FH2 may be formed in the upper front end of the convex part. For example, a plurality of convex parts may be provided to correspond to a plurality of fastening members 310. The second fastening hole FH2 may be formed in the upper front end of each convex part. Accordingly, a kind of concave part may be formed between the plurality of convex parts (e.g., a central portion). If such a shape is formed, assembly can be improved because a user can easily recognize a location where the fastening member 310 will be fastened. Furthermore, portions of the second bottom surface 114a and the fastening portion 212 to which the fastening member 310 is fastened can be closely attached, and a problem attributable to interference or twisting of the second bottom surface 114a and the fastening portion 212 can be minimized.

For example, a protruding structure 112c protruding from the front side of the sink portion 112 to the rear is provided and inserted between the plurality of convex parts of the fastening portion 212. Accordingly, the fixing structure of the sink portion 112 and the fastening portion 212 can be further stabilized. However, the present disclosure is not limited thereto, and various modifications, such as that the protruding structure 112c, the plurality of convex parts, etc. are not provided, are possible.

The fastening member 310 is fastened by the first coupling part 110 and the second coupling part 210, and fixes the first coupling part 110 and the second coupling part 210 by a fastening structure. More specifically, the fastening member 310 may be upward extended from the bottom of the second coupling part 210 through the second coupling part 210 and the first coupling part 110, and may be fastened to the second coupling part 210 and the first coupling part 110. Accordingly, the support member 20 and the display unit 10 can be more firmly fixed because the support member 20 including the second coupling part 210 and the display unit 10 including the first coupling part 110 can be fixed by the fastening structure using the fastening member 310. Furthermore, the fastening member 310 is extended from an internal space of the support pole 22 to an internal space (more specifically, an internal space of the inside bracket 118) of the display unit 10. Accordingly, an external appearance of the display device 100 can be improved because the fastening member 310 is not recognized in the outside.

The fastening member 310 may have various structures or shapes, such as a screw. The fastening member 310 may be extended up to the top of the first bottom surface 112a through the first bottom surface 112a of the sink portion 112. An inside bracket 118 that covers and fixes the fastening member 310 may be further positioned on the sink portion 112. The fastening member 310 passing through the second coupling part 210 and the first coupling part 110 may be fixed to the inside bracket 118 by a structure, such as a nut or a screw mountain formed in the inside bracket 118. However, the present disclosure is not limited thereto, and the fastening member 310 may be fixed by only the first and second fastening holes FH1 and FH2 and various other structures may be applied.

The fastening portion 212 may be formed in the inner surface part 204. Accordingly, the first and second seated parts 214b and 214c and/or the third seated part 214a (sliding coupling portion) involved in the sliding coupling and the fastening portion 212 involved in the fastening and fixing may be formed in separate structures in order to minimize interference therebetween, but the present disclosure is not limited thereto. Accordingly, the first and second seated parts 214b and 214c and/or the third seated part 214a and the fastening portion 212 may be positioned in the same outer surface part 202 or inner surface part 204 or the support member 202 may not separately include the outer surface part 202 and the inner surface part 204. Various other modifications are possible.

According to the present embodiment, the display unit 10 is supported by the support member 20 positioned under the display unit 10. Structural stability can be improved because the support member 20 directly supports weight of the display unit 10. Accordingly, a problem which may occur due to shaking, etc. (e.g., a phenomenon in which a fine movement occurs or the display device 100 falls, such as that the display device 100 is shaken back and forth due to shaking, etc.) can be prevented. In this case, assembly convenience can be improved by sliding and coupling the support member 20 to the display unit 10 through fixing or temporary fixing. Furthermore, the fixing or temporary fixing by the sliding and coupling can be more stably performed by the stopper member 320. The display unit 10 and the support member 20 can be firmly fixed as a simple structure by the fastening and fixing of the fastening member 310. For example, the support member 20 may be provided as one piece having an integrated structure or a single body, so that assembly convenience, a reduction of the material cost, a neat design, etc. can be implemented.

The features, structures, effects and the like according to the above-described embodiments are included in at least one embodiment of the present disclosure and are not necessarily limited to one embodiment. Furthermore, the features, structures, effects and the like illustrated in each embodiment may be combined with other embodiments and modified by other persons skilled in the art to which embodiments belong. Therefore, it should be understood that descriptions related to these combinations and modifications are included in the range of the present disclosure.

The invention claimed is:
1. A display device comprising:
a display unit in which a first coupling part is provided in a bottom part thereof; and
a support member in which a second coupling part is provided in a top thereof,
wherein the display unit is supported on the support member by slidingly coupling the second coupling part to the first coupling part from a rear side of the first coupling part to a front side of the second coupling part; and
a stopper member positioned in a portion adjacent to a front of the display unit in the first coupling part and the second coupling part,
wherein the stopper member comprises:
a protruding portion upward protruding from the second coupling part, an accommodation portion formed in the first coupling part and formed to accommodate the protruding portion at a location corresponding to the protruding portion, and a trapping jaw extended from a rear of the accommodation portion to a lower side thereof.

2. The display device of claim 1, wherein the display unit further comprises a concave part having a rear opened, wherein the first coupling part is positioned in the concave part, and wherein the second coupling part is composed of a protruding part protruding to a top of the support member and is slidingly coupled with the first coupling part by inserting the second coupling part or the protruding part into the first coupling part or the concave part from the rear side to the front side.

3. The display device of claim 1, wherein the display unit comprises a display module and a cover coupled to a rear of the display module, and wherein the first coupling part is provided in a bottom part of the cover.

4. The display device of claim 1, wherein the top of the support member is generally positioned under the bottom part of the display unit and supports the display unit.

5. The display device of claim 1, further comprising a fastening member fastened to the first coupling part and the second coupling part and configured to fasten and fix the first coupling part and the second fastening part.

6. The display device of claim 5, wherein the fastening member is extended from a bottom of the second coupling part to an upper side thereto through the second coupling part and the first coupling part and fastened to the second coupling part and the first coupling part to fasten and fix a top of the support member and the bottom part of the display unit.

7. The display device of claim 1, wherein the first coupling part comprises:

a sink portion comprising a first bottom surface positioned over a main bottom surface in the bottom part of the display unit; and a coupling portion comprising a second bottom surface positioned within the sink portion and spaced apart from the first bottom surface and first and second rail parts extended from both sides of the second bottom surface to lower sides thereof and then extended to an outside.

8. The display device of claim 7, wherein the second coupling part comprises a first seated part and a second seated part inserted between the first bottom surface and the first rail part, and the second rail part, respectively, and seated on the first rail part and the second rail part, respectively.

9. The display device of claim 8, wherein the second coupling part further comprises a third seated part configured to connect the first seated part and the second seated part in a rear thereof and inserted between the first bottom surface and the second bottom surface.

10. The display device of claim 8, wherein the first or second rail part is slantly formed so that a distance between the first bottom surface and the first or second rail part is gradually reduced toward a front, and wherein the first or second seated part comprises a portion inclined so that a thickness of the first or second seated part is gradually reduced toward the front.

11. The display device of claim 7, wherein a first fastening hole is provided in each of the first and second bottom surfaces in the first coupling part, wherein the second coupling part comprises a fastening portion having a shape upward protruding toward the second bottom surface and comprising a second fastening hole, and wherein the display device further comprises a fastening member inserted under the fastening portion and fastened to the first coupling part and the second coupling part through the first fastening hole and the second fastening hole.

12. The display device of claim 11, wherein a convex part protruding in accordance with the fastening member is provided in the fastening portion, and wherein the second fastening hole is formed in an upper front end of the convex part.

13. The display device of claim 1, wherein the display unit comprises a display module and a cover coupled to a rear of the display module, wherein the display unit further comprises a fixing member configured to protrude from an inside of the cover toward a front and spaced apart from a main bottom surface of the cover, and wherein the display unit further comprises a circuit unit at least part of which is fixed between the main bottom surface and the fixing member.

14. The display device of claim 13, wherein the fixing member comprises a first fixing member and a second fixing member protruding from the inside of the cover toward the front, and wherein the circuit unit comprises:

a circuit assembly having both sides fixed to the first fixing member and the second fixing member, and a cable connected to the circuit assembly and positioned between the inside of the cover and the circuit assembly between the first or second fixing member and the main bottom surface.

15. The display device of claim 1, wherein the support member comprises:

an outer surface part constituting an outer surface, and an inner surface part fixed within the outer surface part.

16. The display device of claim 15, further comprising a fastening member fastened to the first coupling part and the second coupling part and configured to fasten and fix the first coupling part and the second fastening part, wherein a sliding coupling portion involved in the sliding coupling in the second coupling part is formed in the outer surface part, and wherein a fastening portion involved in the fastening and fixing by the fastening member in the second coupling part is formed in the inner surface part.

17. The display device of claim 16, wherein a portion of the stopper member formed in the second coupling part is formed in the outer surface part.

18. The display device of claim 1, wherein the support member comprises:

a support pole having the second fastening part positioned thereon and up and down extending in a central part thereof, and a prop coupled to a bottom of the support pole to constitute a bottom surface, and wherein the support member has an integrated structure, so the display device is assembled by the coupling of the support member and the display unit.

* * * * *